(12) United States Patent
Hsieh

(10) Patent No.: US 9,450,510 B2
(45) Date of Patent: Sep. 20, 2016

(54) ENERGY HARVESTING DEVICE USING SSHI TECHNIQUES

(71) Applicant: NATIONAL TSING HUA UNIVERSITY, Hsinchu (TW)

(72) Inventor: Ping-Hsuan Hsieh, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 191 days.

(21) Appl. No.: 14/300,926

(22) Filed: Jun. 10, 2014

(65) Prior Publication Data

US 2015/0263643 A1 Sep. 17, 2015

(30) Foreign Application Priority Data

Mar. 13, 2014 (TW) .............................. 103109103 A

(51) Int. Cl.
*H02M 7/217* (2006.01)
*H02M 7/219* (2006.01)

(52) U.S. Cl.
CPC .............. *H02M 7/219* (2013.01); *H02M 7/217* (2013.01); *H02M 2007/2195* (2013.01); *Y02B 70/1408* (2013.01)

(58) Field of Classification Search
CPC ..................... H02M 2007/2195; H02M 1/081; H02M 1/082; H02M 1/088; H02M 1/083; H02M 7/217; H02M 7/21; H02M 7/2173; H02M 7/219; H02M 7/06; H02M 7/066; H02M 7/08; H02M 7/10; H02M 7/23; H02M 7/25; H02N 2/188; H02N 2/181
See application file for complete search history.

(56) References Cited

U.S. PATENT DOCUMENTS

| 2003/0034715 A1* | 2/2003 | Burns | H02N 2/181 310/339 |
| 2009/0230924 A1* | 9/2009 | Wright | H02N 2/181 320/148 |
| 2014/0036560 A1* | 2/2014 | Satyamoorthy | H02M 7/066 363/126 |

FOREIGN PATENT DOCUMENTS

JP WO2015/022794 * 2/2015 ............. H02N 2/181

* cited by examiner

*Primary Examiner* — Harry Behm
(74) *Attorney, Agent, or Firm* — Birch, Stewart, Kolasch & Birch, LLP

(57) ABSTRACT

An energy harvesting device harvests energy from an energy source, and includes an inductor and a control switch coupled in series, and a control module. The series connection of the inductor and the control switch is adapted to be coupled to the energy source in parallel or in series. The control module is coupled to the control switch, and controls operation of the control switch between an ON state and an OFF state such that the control switch starts to operate in the ON state for a predetermined time period from a transition time point during each predetermined cycle starting from a start time point, and such that a time difference between the transition time point and the start time point is variable.

15 Claims, 13 Drawing Sheets

ENERGY HARVESTING DEVICE USING SSHI TECHNIQUES

CROSS-REFERENCE TO RELATED APPLICATION

This application claims priority of Taiwanese Application No. 103109103, filed on Mar. 13, 2014, the contents of which are hereby incorporated by reference.

BACKGROUND OF THE INVENTION

1. Field of the Invention

This invention relates to an energy harvesting device, and more particularly to an energy harvesting device using SSHI (synchronized switch harvesting on an inductor) techniques.

2. Description of the Related Art

Referring to FIGS. 1 and 2, two conventional energy harvesting devices 11, 11' are disclosed in "Revisit of series-SSHI with comparisons to other interfacing circuits in piezoelectric energy harvesting" by I. C. Lien et al., *Smart Materials and Structures*, vol. 19, no. 12, pp. 125009, 2010.

The first conventional energy harvesting device 11 is coupled between a piezoelectric vibrating device 12 and a load 13. The piezoelectric vibrating device 12 vibrates at an operating frequency in response to a force applied thereto, and converts the vibration into an AC voltage. The first conventional energy harvesting device 11 converts the AC voltage from the piezoelectric vibrating device 12 into a DC voltage, and outputs the DC voltage to the load 13. The first conventional energy harvesting device 11 uses parallel-SSHI techniques, where a series connection of a switch 111 and an inductor 112 is coupled to the piezoelectric vibrating device 12 in parallel, and where the switch 111 operates in an ON state for a predetermined time period each time a vibration displacement of the piezoelectric vibrating device 12 reaches its extremum (i.e., a phase difference between a center time point of the predetermined time period and a respective time point at which the vibration displacement reaches its extremum is zero). As a result, energy harvested by the first conventional energy harvesting device 11 from the piezoelectric vibrating device 12 reaches its maximum when the operating frequency of the piezoelectric vibrating device 12 is equal to a short circuit resonant frequency of the same. However, the harvested energy decreases rapidly with deviation of the operating frequency from the short circuit resonant frequency.

The second conventional energy harvesting device 11' differs from the first conventional energy harvesting device 11 in that the second conventional energy harvesting device 11' uses series-SSHI techniques, where the series connection of the switch 111 and the inductor 112 is coupled to the piezoelectric vibrating device 12 in series, and where the switch 111 operates in the ON state for the predetermined time period each time the vibration displacement of the piezoelectric vibrating device 12 reaches its extremum (i.e., the phase difference between the center time point of the predetermined time period and the respective time point at which the vibration displacement reaches its extremum is zero). As a result, energy harvested by the second conventional energy harvesting device 11' from the piezoelectric vibrating device 12 reaches its maximum when the operating frequency of the piezoelectric vibrating device 12 is equal to an open circuit resonant frequency of the same. However, the harvested energy decreases rapidly with deviation of the operating frequency from the open circuit resonant frequency.

SUMMARY OF THE INVENTION

Therefore, an object of this invention is to provide an energy harvesting device that can overcome the aforesaid drawbacks associated with the prior art.

According to one aspect of this invention, there is provided an energy harvesting device for harvesting energy from an energy source. The energy harvesting device comprises an inductor and a control switch coupled in series, and a control module. The series connection of the inductor and the control switch is adapted to be coupled to the energy source in parallel or in series. The control module is coupled to the control switch, and controls operation of the control switch between an ON state and an OFF state such that the control switch starts to operate in the ON state for a predetermined time period from a transition time point during each predetermined cycle starting from a start time point, and such that a time difference between the transition time point and the start time point is variable.

According to another aspect of this invention, there is provided an energy harvesting device for harvesting energy from an energy source that outputs an alternating current (AC) voltage. The energy harvesting device comprises an AC-to-DC (direct current) converting module, an inductor, a control switch, a filtering capacitor and a control module. The AC-to-DC converting module has two input terminals adapted to be coupled to the energy source for receiving the AC voltage therefrom, and two output terminals. The AC-to-DC converting module converts the AC voltage into a DC voltage, and outputs the DC voltage at the output terminals. The inductor and the control switch are coupled in series between the input terminals of the AC-to-DC converting module. The filtering capacitor is coupled between the output terminals of the AC-to-DC converting module. The control module is coupled to the control switch, and controls operation of the control switch between an ON state and an OFF state such that the control switch starts to operate in the ON state for a predetermined time period from a transition time point during each predetermined cycle starting from a start time point, and such that a time difference between the transition time point and the start time point is variable.

According to yet another aspect of this invention, there is provided an energy harvesting device for harvesting energy from an energy source that outputs an AC voltage. The energy harvesting device comprises an AC-to-DC converting module, an inductor, a control switch, a filtering capacitor and a control module. The AC-to-DC converting module has two input terminals adapted to be coupled to the energy source for receiving the AC voltage therefrom, and two output terminals. The AC-to-DC converting module converts the AC voltage into a DC voltage, and outputs the DC voltage at the output terminals. The inductor, the control switch and the filtering capacitor are coupled in series between the output terminals of the AC-to-DC converting module. The control module is coupled to the control switch, and controls operation of the control switch between an ON state and an OFF state such that the control switch starts to operate in the ON state for a predetermined time period from a transition time point during each predetermined cycle starting from a start time point, and such that a time difference between the transition time point and the start time point is variable.

BRIEF DESCRIPTION OF THE DRAWINGS

Other features and advantages of this invention will become apparent in the following detailed description of the preferred embodiments of this invention with reference to the accompanying drawings, of which.

DETAILED DESCRIPTION OF THE PREFERRED EMBODIMENTS

Figure 1:
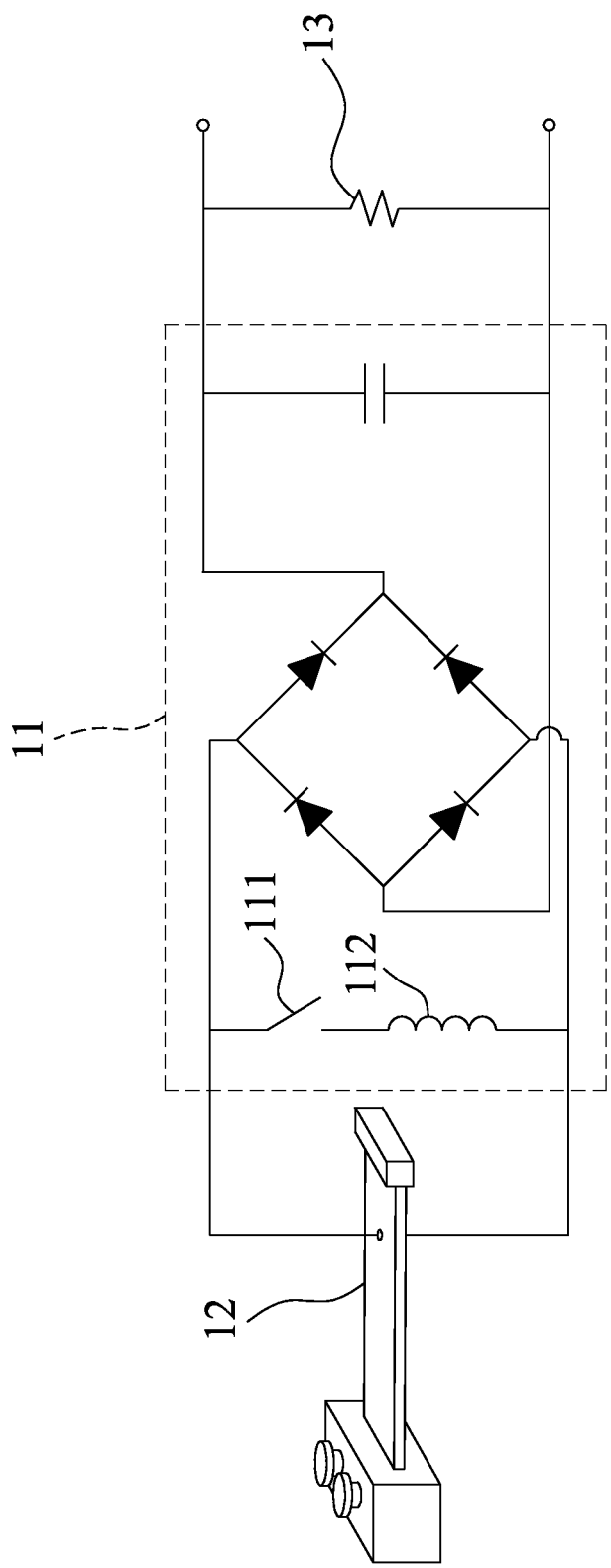
FIG. 1 is a schematic circuit diagram illustrating a first conventional energy harvesting device.

Before this invention is described in greater detail with reference to the accompanying preferred embodiments, it should be noted herein that like elements are denoted by the same reference numerals throughout the disclosure.

Before describing this invention in detail, it should be noted herein that throughout this disclosure, when two elements are described as being "coupled in series," "connected in series" or the like, it is merely intended to portray a serial connection between the two elements without necessarily implying that the currents flowing through the two elements are identical to each other and without limiting whether or not an additional element is coupled to a common node between the two elements. Essentially, "a series connection of elements," "a series coupling of elements" or the like as used throughout this disclosure should be interpreted as being such when looking at those elements alone.

Figure 3:
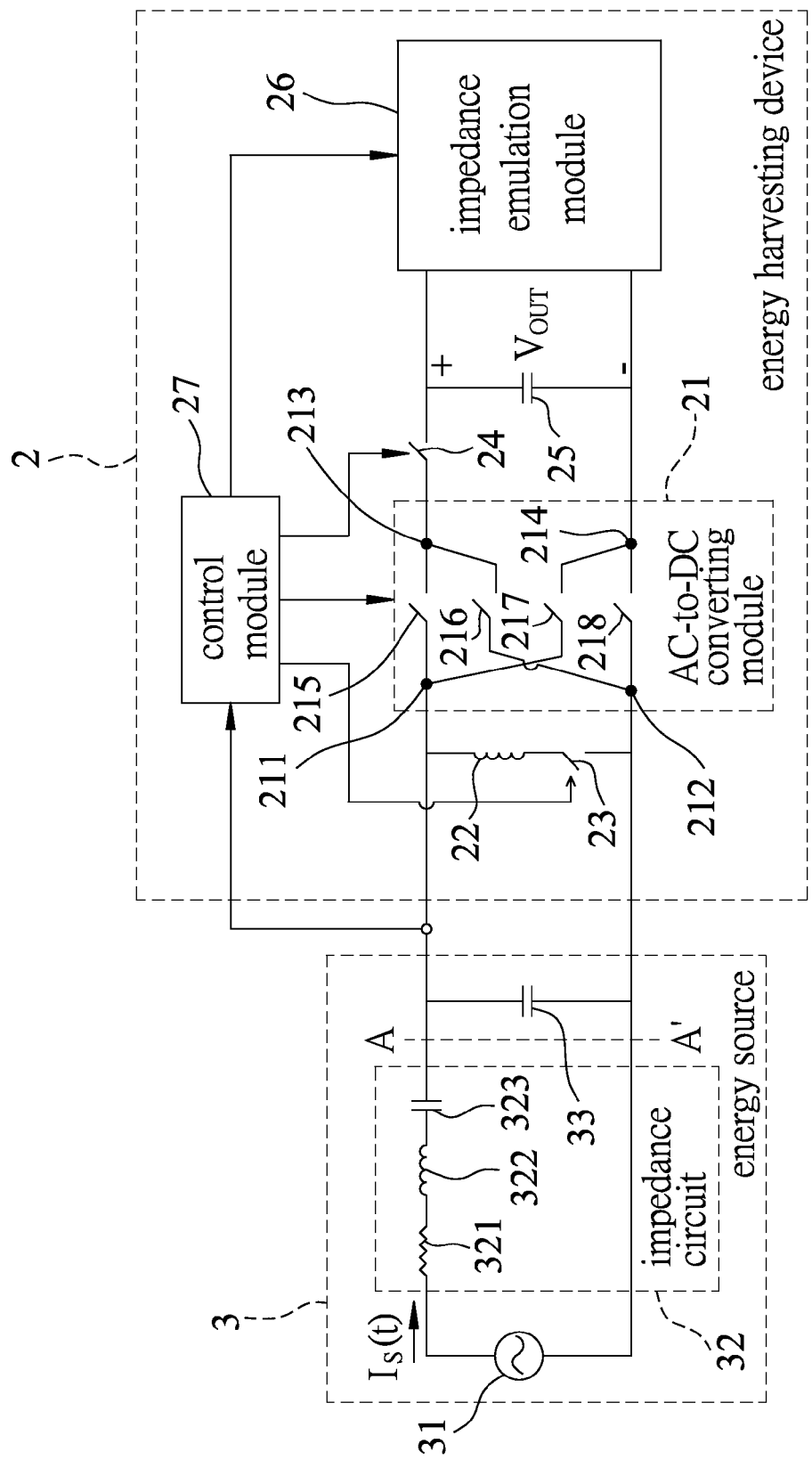
FIG. 3 is a schematic circuit diagram illustrating the first and second preferred embodiments of an energy harvesting device according to this invention.

Referring to FIG. 3, the first preferred embodiment of an energy harvesting device 2 according to this invention harvests energy from an energy source 3 that equivalently includes at least an alternating current (AC) supply 31 and an impedance circuit 32. The AC supply 31 supplies a source voltage and a source current $I_S(t)$ to the impedance circuit 32, and the impedance circuit 32 outputs an AC voltage and an AC current. In this embodiment, the energy source 3 is a piezoelectric vibrating device that vibrates at an operating frequency in response to a force applied thereto and that converts the vibration into electricity. Therefore, the energy source 3 further includes a clamp capacitor 33, the source voltage supplied by the AC supply 31 is positively proportional to the force, and the impedance circuit 32 includes a source resistor 321, a source inductor 322 and a source capacitor 323 coupled in series between the AC supply 31 and the clamp capacitor 33, and outputs the AC voltage and the AC current across the clamp capacitor 33. However, in other embodiments, the energy source 3 may be a device that receives and converts electromagnetic radiation into electricity, or a device that receives electricity through inductive coupling.

The energy harvesting device 2 uses parallel-SSHI (synchronized switch harvesting on an inductor) techniques, and includes an AC-to-DC (direct current) converting module 21, an inductor 22, first and second control switches 23, 24, a filtering capacitor 25, an impedance emulation module 26 and a control module 27.

The AC-to-DC converting module 21 includes first and second input terminals 211, 212 adapted to be coupled to the energy source 3 for receiving the AC voltage therefrom, first and second output terminals 213, 214 for outputting a DC voltage, and first to fourth converting switches 215-218. The first converting switch 215 is coupled between the first input terminal 211 and the first output terminal 213. The second converting switch 216 is coupled between the second input terminal 212 and the first output terminal 213. The third converting switch 217 is coupled between the first input terminal 211 and the second output terminal 214. The fourth converting switch 218 is coupled between the second input terminal 212 and the second output terminal 214.

The inductor 22 and the first control switch 23 are coupled in series between the first and second input terminals 211, 212 of the AC-to-DC converting module 21 (i.e., the series connection of the inductor 22 and the first control switch 23 is coupled to the energy source 3 in parallel). The impedance emulation module 26 is coupled to the filtering capacitor 25 in parallel, and has a variable impedance. The second control switch 24 and the parallel connection of the filtering capacitor 25 and the impedance emulation module 26 are coupled in series between the first and second output terminals 213, 214 of the AC-to-DC converting module 21. The impedance emulation module 26 may use techniques disclosed in "Resistor Emulation Approach to Low-Power RF Energy Harvesting" by T. Paing et al., *IEEE Transactions on Power Electronics*, vol. 23, no. 3, pp. 1494, 2008, and details thereof are omitted herein for the sake of brevity.

The control module 27 is coupled to the AC-to-DC converting module 21, the first and second control switches 23, 24 and the impedance emulation module 26, is adapted to be coupled to the energy source 3 for detecting the AC voltage and the AC current therefrom, and obtains an output power of the energy source 3 based on the detected AC voltage and the detected AC current.

The control module 27 controls, based on the detected AC voltage, operation of each of the first to fourth converting switches 215-218 of the AC-to-DC converting module 21 between an ON state and an OFF state such that the first and fourth converting switches 215, 218 operate in the ON state and the second and third converting switches 216, 217 operate in the OFF state when the AC voltage enables a potential at the first input terminal 211 of the AC-to-DC converting module 21 to be higher than a potential at the second input terminal 212 of the same, and such that the second and third converting switches 216, 217 operate in the ON state and the first and fourth converting switches 215, 218 operate in the OFF state when the AC voltage enables the potential at the first input terminal 211 to be lower than the potential at the second input terminal 212. As a result, the AC voltage is converted into the DC voltage.

Referring to FIGS. 3 to 6, the control module 27 controls operation of the first control switch 23 between an ON state and an OFF state such that the first control switch 23 starts to operate in the ON state at a transition time point ($t_1$) for a predetermined time period ($T_{ON}$) during each predetermined cycle (T) starting from a start time point ($t_0$), and such that a time difference between the transition time point ($t_1$) and the start time point ($t_0$) is variable. In this embodiment, the start time point ($t_0$) for each cycle (T) is a respective time point at which a first order derivative of the AC voltage is equal to zero (meanwhile, the source current $I_S(t)$ is equal to zero, and a vibration displacement of the energy source 3 reaches its extremum), and the cycle (T) and the predetermined time period ($T_{ON}$) are expressed by the following equations, respectively:

$$T = 0.5/f, \quad \text{equation 1}$$

and $$T_{ON} = \frac{0.5}{2\pi\sqrt{C_P L_{22}}}, \quad \text{equation 2}$$

where f denotes the operating frequency of the energy source 3, $C_P$ denotes a capacitance of the clamp capacitor 33 of the energy source 3, and $L_{22}$ denotes an inductance of the inductor 22. Therefore, an oscillation between the clamp capacitor 33 and the inductor 22 lasts for only half of what would otherwise be the period of oscillation had the first control switch 23 been constantly in the ON state (i.e., if the first control switch 23 had been omitted), and thus a large change in the AC voltage is expected. In this embodiment, the control module 27 obtains, based on the detected AC voltage, the operating frequency of the energy source 3 and the time points at which the first order derivative of the AC voltage is equal to zero. However, in other embodiments, the control module 27 may instead detect the vibration displacement of the energy source 3, and obtain, based on the detected vibration displacement, the operating frequency of the energy source 3 and the time points at which the first order derivative of the AC voltage is equal to zero.

Figure 4:
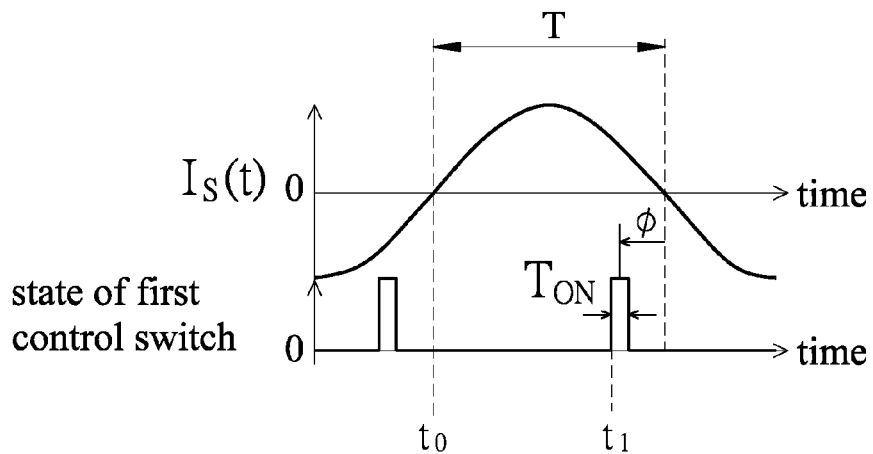
FIG. 4 is an exemplary timing diagram illustrating a source current of an energy source and a state of a first control switch of the energy harvesting device when an operating frequency of the energy source is smaller than a short circuit resonant frequency of the same.
Figure 5:
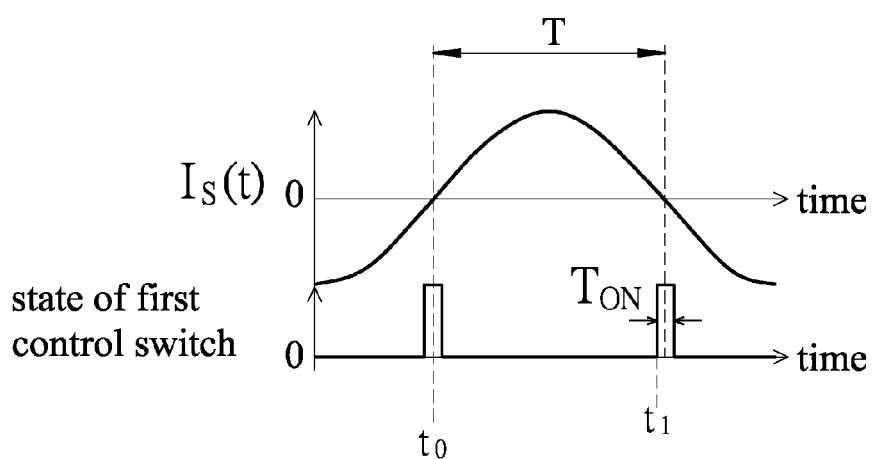
FIG. 5 is an exemplary timing diagram illustrating the source current of the energy source and the state of the first control switch of the energy harvesting device when the operating frequency of the energy source is equal to the short circuit resonant frequency of the same.
Figure 6:
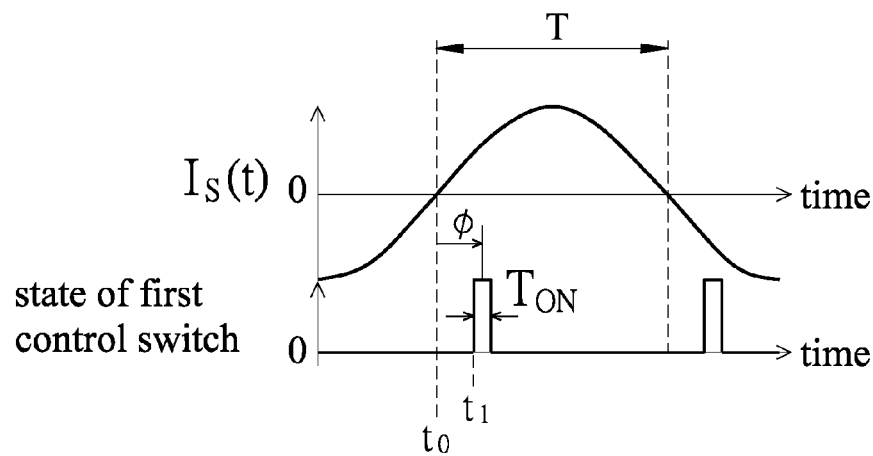
FIG. 6 is an exemplary timing diagram illustrating the source current of the energy source and the state of the first control switch of the energy harvesting device when the operating frequency of the energy source is greater than the short circuit resonant frequency of the same.

The control module 27 further adjusts, for each cycle (T), the time difference between the transition time point ($t_1$) and the start time point ($t_0$) to change a phase difference ($\phi$) between a center time point of the predetermined time period ($T_{ON}$) and a closest time point at which the first order derivative of the AC voltage is equal to zero, and also further adjusts the impedance of the impedance emulation module 26 to change a voltage ($V_{OUT}$) across the filtering capacitor 25 in such a way that the output power of the energy source 3 is increased. Theoretically, when the time difference between the transition time point ($t_1$) and the start time point ($t_0$) is adjusted to equal a target time difference ($T_{TARGET}$) that makes the phase difference ($\phi$) equal a target phase difference ($\phi_{TARGET}$) and when the impedance of the impedance emulation module 26 is adjusted to equal a value that makes the voltage ($V_{OUT}$) equal a target voltage ($V_{TARGET}$), impedances at two sides of an interface (A-A') are complex conjugates of each other, and thus the output power of the energy source 3 reaches its maximum. The target phase difference ($\phi_{TARGET}$) the target time difference ($T_{TARGET}$) and the target voltage ($V_{TARGET}$) are expressed by the following equations, respectively:

$$\phi_{TARGET} = \arctan\frac{X_S(\omega)}{R_S}, \quad \text{equation 3}$$

$$T_{TARGET} = \frac{\phi_{TARGET}}{\omega} - 0.5T_{ON} + nT, \quad \text{equation 4}$$

and $$V_{TARGET} = \frac{\pi}{8}\frac{1}{\cos\phi_{TARGET}}V_S, \quad \text{equation 5}$$

where $R_S$ and $X_S(\omega)$ denote a resistance and a reactance of the impedance circuit 32 of the energy source 3, respectively, $\omega=2\pi f$, n is an integer that is greater than or equal to zero and that makes $T_{TARGET} \geq 0$ and $V_S$ denotes an amplitude of the source voltage. In this embodiment, $R_S=R_{321}$ and $X_S(\omega)=\omega L_{322}-1/\omega C_{323}$ where $R_{321}$, $L_{322}$ and $C_{323}$ respectively denote a resistance of the source resistor 321, an inductance of the source inductor 322 and a capacitance of the source capacitor 323. As shown in FIG. 4, when the operating frequency of the energy source 3 is smaller than a short circuit resonant frequency of the same (i.e., $1/\sqrt{L_{322}C_{323}}$), the phase difference ($\phi$) is negative. As shown in FIG. 5, when the operating frequency is equal to the short circuit resonant frequency, the phase difference ($\phi$) is equal to zero. As shown in FIG. 6, when the operating frequency is greater than the short circuit resonant frequency, the phase difference ($\phi$) is positive.

The control module 27 controls operation of the second control switch 24 between an ON state and an OFF state such that the second control switch 24 operates in the OFF state when the first control switch 23 operates in the ON state, and such that the second control switch 24 operates in the ON state when the first control switch 23 operates in the OFF state.

It is noted that, in other embodiments, the following modifications may be made to the first preferred embodiment:

1. The second control switch 24 may be omitted. In this case, the filtering capacitor 25 is coupled between the first and second output terminals 213, 214 of the AC-to-DC converting module 21.

2. The impedance emulation module 26 may be omitted.

3. The start time point ($t_0$) of each cycle (T) may not be the respective time point at which the first order derivative of the AC voltage is equal to zero.

4. Each of the first to fourth converting switches 215-218 of the AC-to-DC converting module 21 may be replaced by a diode. In this case, the AC-to-DC converting module 21 converts the AC voltage into the DC voltage without the control of the control module 27.

5. The control module 27 may obtain an output power of the energy harvesting device 2 based on, for example, the voltage ($V_{OUT}$) and the impedance of the impedance emulation module 26, and may adjust the time difference between the transition time point ($t_1$) and the start time point ($t_0$) and the impedance of the impedance emulation module 26 such that the output power of the energy harvesting device 2 is increased.

Figure 7:
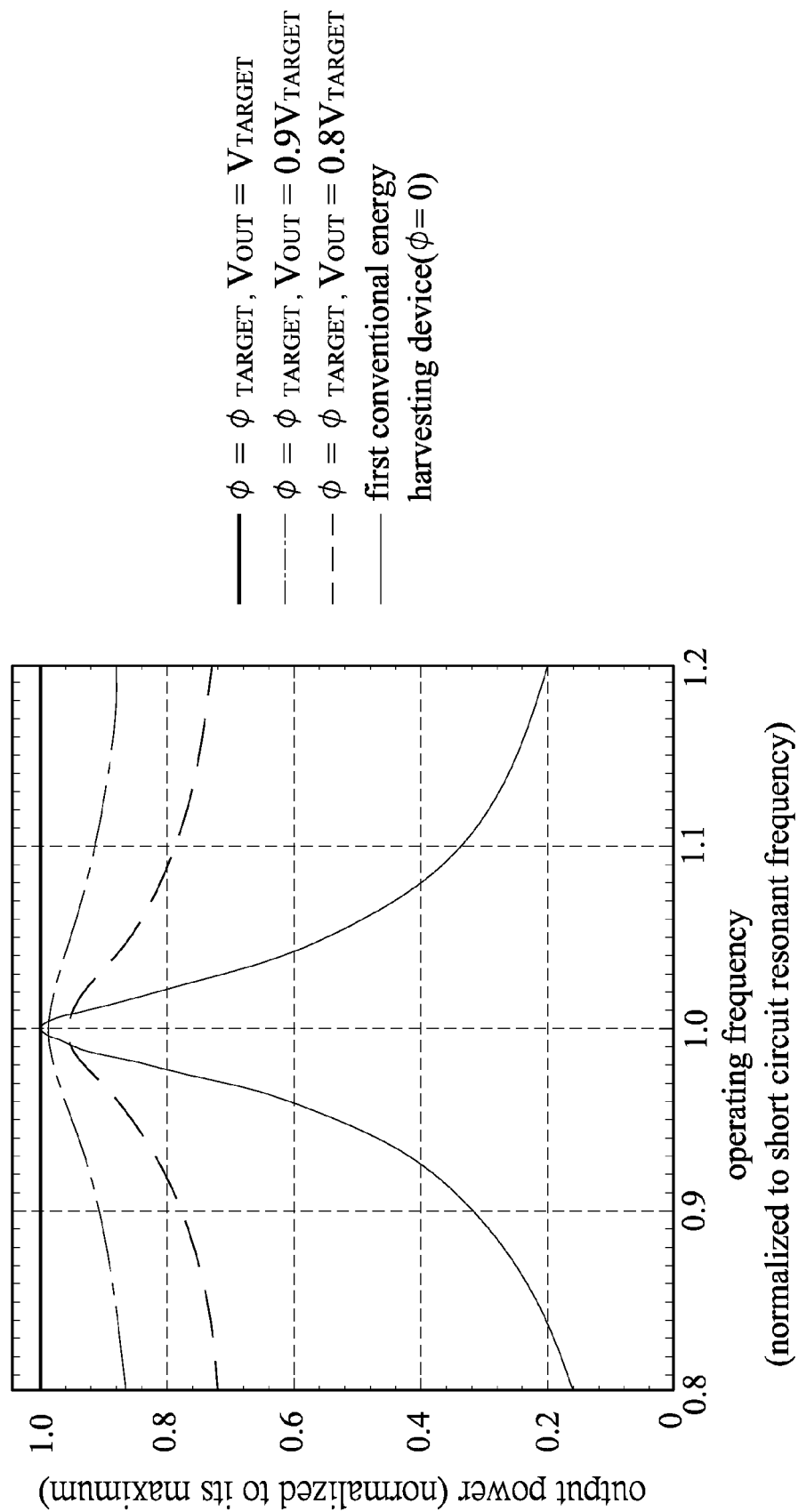
FIG. 7 is a diagram illustrating a relationship between the operating frequency and an output power of the energy source in various conditions.

In view of the above, it is known from a simulation result shown in FIG. 7 that, in this embodiment, since the control module 27 adjusts the time difference between the transition time point ($t_1$) and the start time point ($t_0$) to make the phase difference ($\phi$) equal the target phase difference ($\phi_{TARGET}$) and adjusts the impedance of the impedance emulation module 26 to make the voltage ($V_{OUT}$) equal the target voltage ($V_{TARGET}$) the output power of the energy source 3 and thus the energy harvested by the energy harvesting device 2 from the energy source 3 do not change with deviation of the operating frequency of the energy source 3 from the short circuit resonant frequency of the same. Moreover, even if the voltage ($V_{OUT}$) is not equal to the target voltage ($V_{TARGET}$), the energy harvested by the energy harvesting device 2 from the energy source 3 decreases less rapidly with the deviation of the operating frequency from the short circuit resonant frequency as compared to the first conventional energy harvesting device 11 (see FIG. 1).

Referring to FIGS. 3 to 6, the second preferred embodiment of an energy harvesting device 2 according to this invention is a modification of the first preferred embodiment. Unlike the first preferred embodiment, the control module 27 of the second preferred embodiment only detects the AC voltage, and does not detect the AC current nor does it obtain the output power of the energy source 3. Moreover, the control module 27 obtains the target time difference ($T_{TARGET}$) of Equation 4 based on the resistance and the reactance of the impedance circuit 32 of the energy source 3, on the operating frequency of the energy source 3 and on the predetermined time period ($T_{ON}$), and controls the time difference between the transition time point ($t_1$) and the start time point ($t_0$) to be equal to the target time difference ($T_{TARGET}$). The control module 27 further obtains the target voltage ($V_{TARGET}$) of Equation 5 based on the resistance and the reactance of the impedance circuit 323 of the energy source 3 and on the amplitude of the source voltage, and controls the impedance of the impedance emulation module 26 based on the target voltage ($V_{TARGET}$) such that the voltage ($V_{OUT}$) is equal to the target voltage ($V_{TARGET}$).

It is noted that the second preferred embodiment is suitable under the circumstance where the resistance and the reactance of the impedance circuit 323 of the energy source 3 and the amplitude of the source voltage can be known precisely. On the contrary, the first preferred embodiment is suitable for various situations. Moreover, in a circumstance where the resistance and the reactance of the impedance circuit 323 of the energy source 3 and the amplitude of the source voltage can be known approximately, the first and second preferred embodiments can be combined. In such case, the approximate target time difference ($T_{TARGET}$) is obtained based on Equation 4 and serves as an initial value of the time difference between the transition time point ($t_1$) and the start time point ($t_0$), the approximate target voltage ($V_{TARGET}$) is obtained based on Equation 5, an initial value of the impedance of the impedance emulation module 26 is obtained based on the approximate target voltage ($V_{TARGET}$) and the time difference between the transition time point ($t_1$) and the start time point ($t_0$) and the impedance of the impedance emulation module 26 are then adjusted from these initial values, thereby reducing the overall adjustment time.

Figure 8:
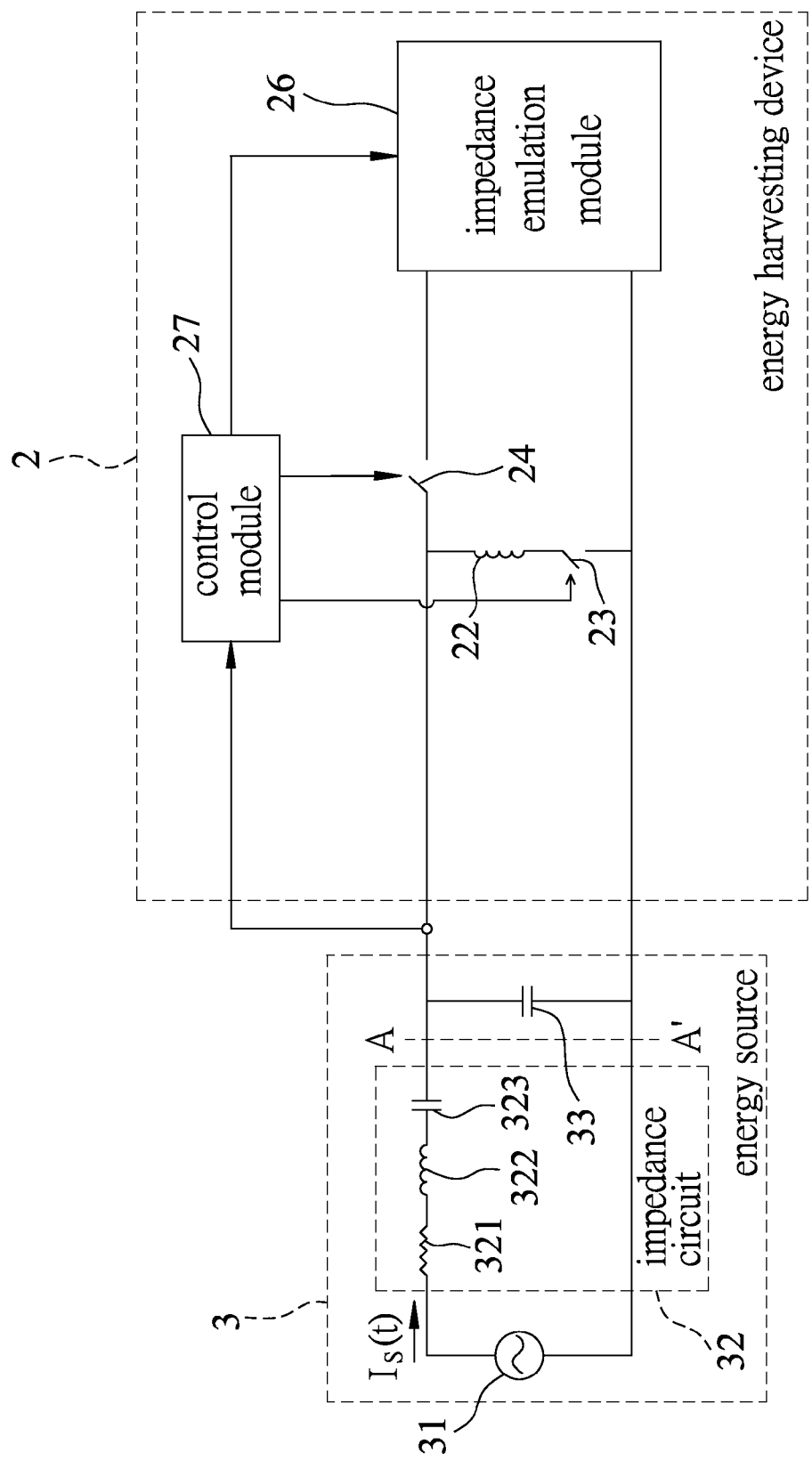
FIG. 8 is a schematic circuit diagram illustrating the third preferred embodiment of an energy harvesting device according to this invention.

Referring to FIG. 8, the third preferred embodiment of an energy harvesting device 2 according to this invention is a modification of the first preferred embodiment. Unlike the first preferred embodiment, the energy harvesting device 2 of the third preferred embodiment does not include the AC-to-DC converting module 21 (see FIG. 3) and the filtering capacitor 25 (see FIG. 3). Therefore, the energy harvesting device 2 of the third preferred embodiment does not convert the AC voltage into a DC voltage. Moreover, the series connection of the second control switch 24 and the impedance emulation module 26 is coupled to the series connection of the inductor 22 and the first control switch 23 in parallel.

It is noted that, in other embodiments, the second control switch 24 may be omitted. In this case, the impedance emulation module 26 is coupled to the series connection of the inductor 22 and the first control switch 23 in parallel.

Figure 9:
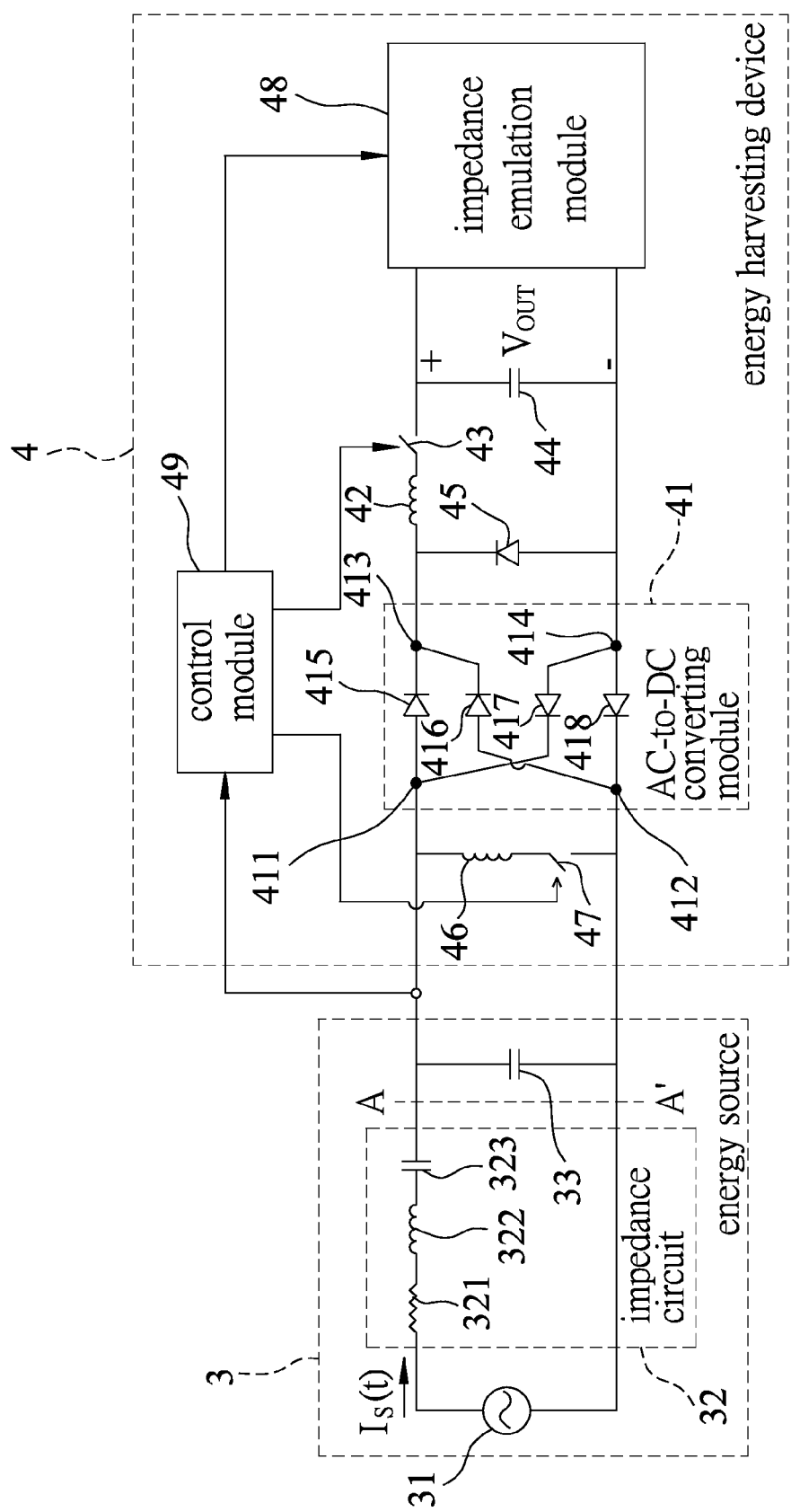
FIG. 9 is a schematic circuit diagram illustrating the fourth and fifth preferred embodiments of an energy harvesting device according to this invention.

Referring to FIG. 9, the fourth preferred embodiment of an energy harvesting device 4 according to this invention harvests energy from the aforesaid energy source 3. The energy harvesting device 4 uses series-SSHI techniques, and includes an AC-to-DC converting module 41, first and second inductors 42, 46, first and second control switches 43, 47, a filtering capacitor 44, a diode 45, an impedance emulation module 48 and a control module 49.

The AC-to-DC converting module 41 includes first and second input terminals 411, 412 adapted to be coupled to the energy source 3 for receiving the AC voltage therefrom, first and second output terminals 413, 414 for outputting a DC voltage, and first to fourth converting diodes 415-418. The first converting diode 415 has an anode coupled to the first input terminal 411, and a cathode coupled to the first output terminal 413. The second converting diode 416 has an anode coupled to the second input terminal 412, and a cathode coupled to the first output terminal 413. The third converting diode 417 has an anode coupled to the second output terminal 414, and a cathode coupled to the first input terminal 411. The fourth converting diode 418 has an anode coupled to the second output terminal 414, and a cathode coupled to the second input terminal 412. The first to fourth converting diodes 415-418 cooperatively convert the AC voltage into the DC voltage.

The impedance emulation module 48 is coupled to the filtering capacitor 44 in parallel, and has a variable impedance. The first inductor 42, the first control switch 43 and the parallel connection of the filtering capacitor 44 and the impedance emulation module 48 are coupled in series between the first and second output terminals 413, 414 of the AC-to-DC converting module 41 (i.e., the series connection of the first inductor 42 and the first control switch 43 is coupled to the energy source 3 in series via the first converting diode 415). The diode 45 has an anode coupled to the second output terminal 414 of the AC-to-DC converting module 41, and a cathode coupled to the first output terminal 413 of the AC-to-DC converting module 41. The diode 45 is capable of releasing energy stored in the first inductor 42. The second inductor 46 and the second control switch 47 are coupled in series between the first and second input terminals 411, 412 of the AC-to-DC converting module 41. The impedance emulation module 48 may use techniques disclosed in "Resistor Emulation Approach to Low-Power RF Energy Harvesting" by T. Paing et al., *IEEE Transactions on Power Electronics*, vol. 23, no. 3, pp. 1494, 2008, and details thereof are omitted herein for the sake of brevity.

The control module 49 is coupled to the first and second control switches 43, 47 and the impedance emulation module 48, is adapted to be coupled to the energy source 3 for detecting the AC voltage and the AC current therefrom, and obtains an output power of the energy source 3 based on the detected AC voltage and the detected AC current.

Figure 10:
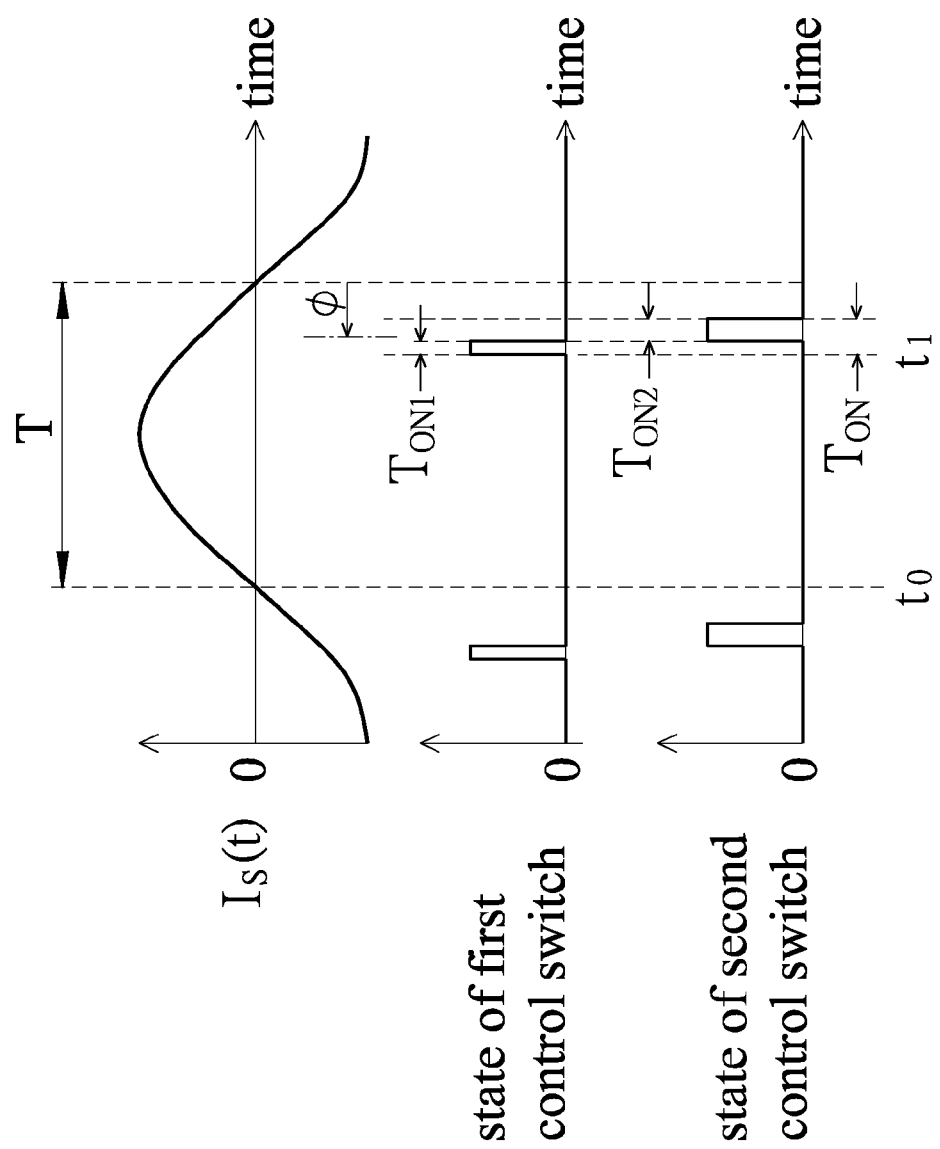
FIG. 10 is an exemplary timing diagram illustrating a source current of an energy source and states of first and second control switches of the energy harvesting device t when an operating frequency of the energy source is smaller than an open circuit resonant frequency of the same.
Figure 11:
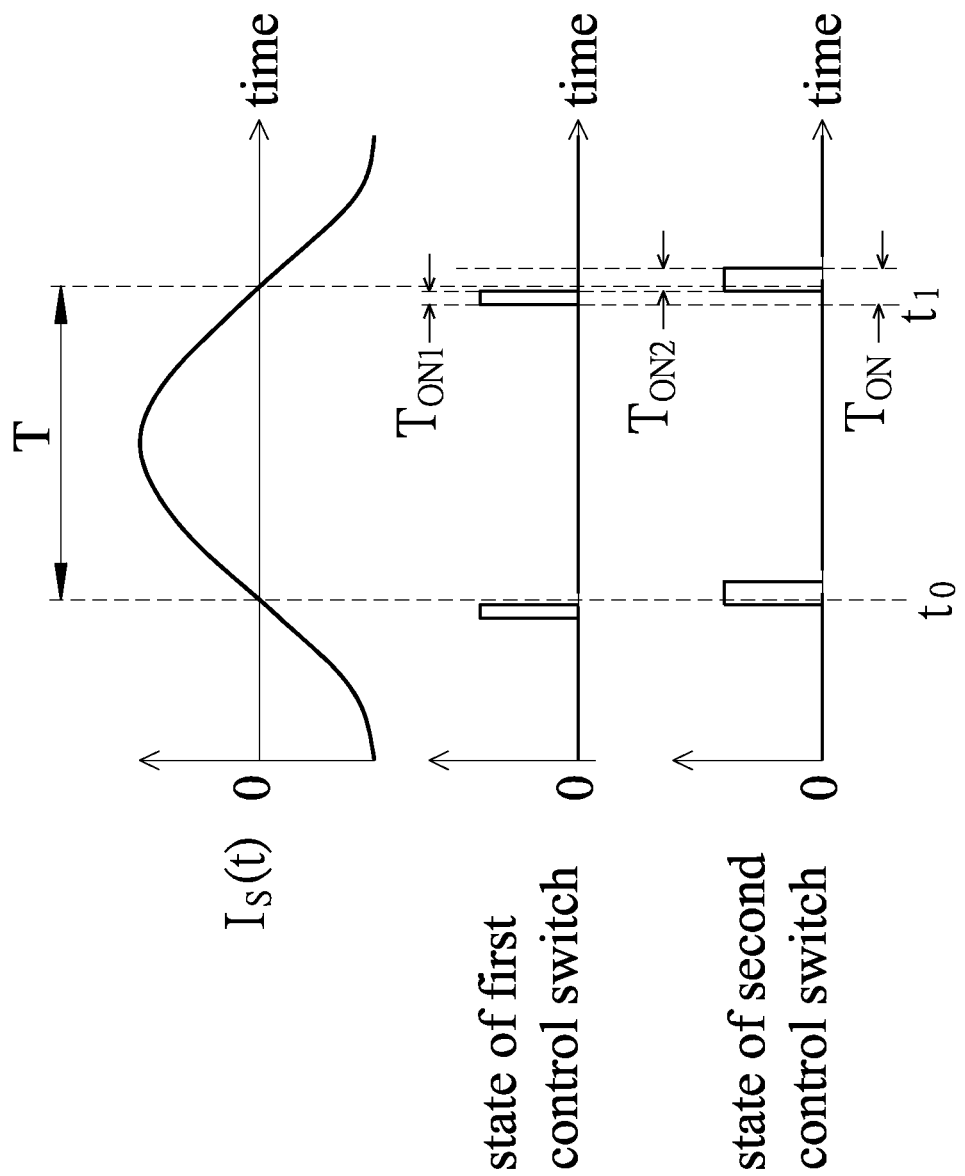
FIG. 11 is an exemplary timing diagram illustrating the source current of the energy source and the states of the first and second control switches of the energy harvesting device when the operating frequency of the energy source is equal to the open circuit resonant frequency of the same.
Figure 12:
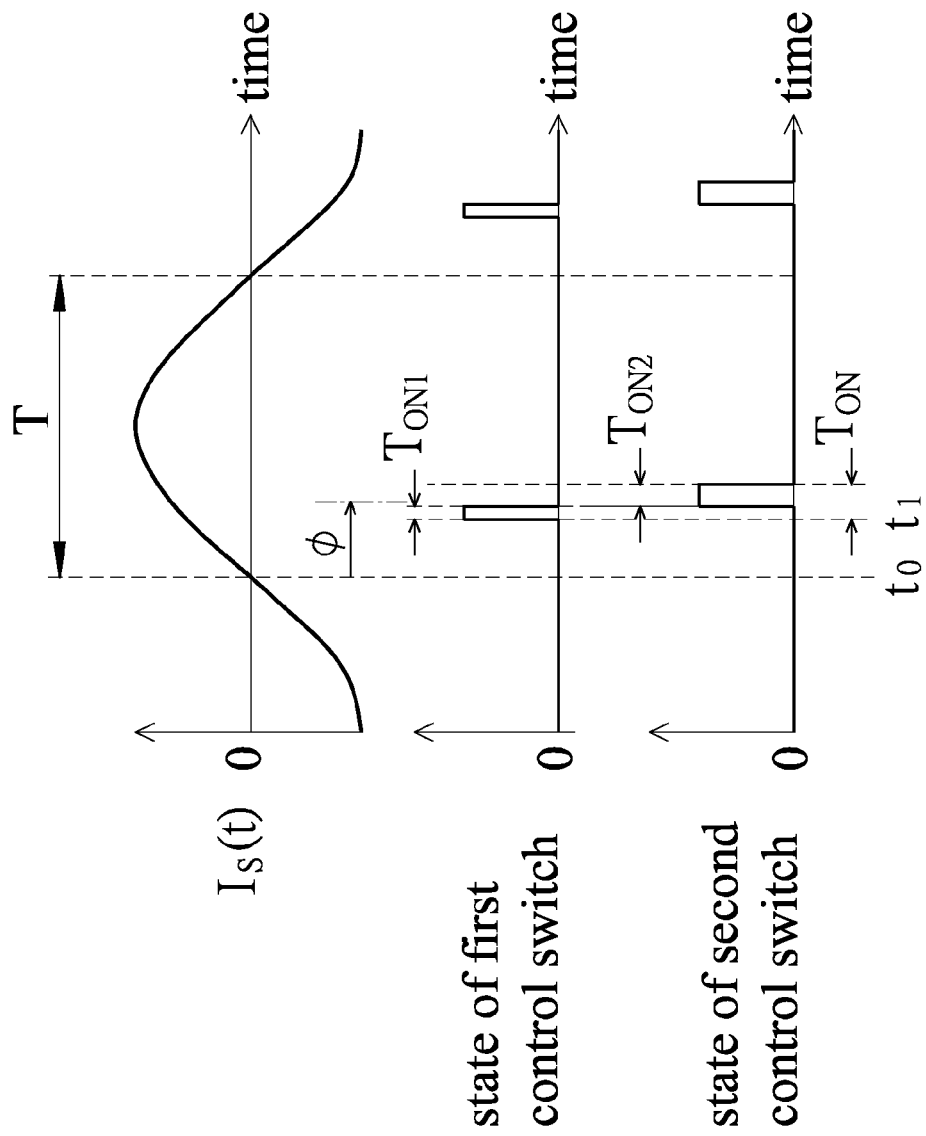
FIG. 12 is an exemplary timing diagram illustrating the source current of the energy source and the states of the first and second control switches of the energy harvesting device when the operating frequency of the energy source is greater than the open circuit resonant frequency of the same.

Referring further to FIGS. 10 to 12, the control module 49 controls operation of the first control switch 43 between an ON state and an OFF state such that the first control switch 43 starts to operate in the ON state for a first predetermined time period ($T_{ON1}$) from a transition time point ($t_1$) during each cycle (T) starting from a start time point ($t_0$), and such that a time difference between the transition time point ($t_1$) and the start time point ($t_0$) is variable. The control module 49 controls operation of the second control switch 47 between an ON state and an OFF state such that the second control switch 47 operates in the ON state for a second predetermined time period ($T_{ON2}$) immediately after each transition of the first control switch 43 from the ON state to the OFF state. In this embodiment, the start time point ($t_0$) of each cycle (T) is a respective time point at which a first order derivative of the AC voltage is equal to zero (meanwhile, the source current $I_S(t)$ is also equal to zero, and a vibration displacement of the energy source 3 reaches its extremum), and the cycle (T), the first predetermined time period ($T_{ON1}$) and the second predetermined time period ($T_{ON2}$) are expressed by the following equations, respectively:

$$T = 0.5/f, \quad \text{equation 6}$$

$$T_{ON1} = \frac{0.25}{2\pi\sqrt{C_P L_{42}}}, \quad \text{equation 7}$$

and $$T_{ON2} = \frac{0.5}{2\pi\sqrt{C_P L_{46}}}, \quad \text{equation 8}$$

where f denotes the operating frequency of the energy source 3, $C_P$ denotes a capacitance of the clamp capacitor 33 of the energy source 3, $L_{42}$ denotes an inductance of the first inductor 42, and $L_{46}$ denotes an inductance of the second inductor 46. Thus, a large change in the AC voltage during a total ON time period ($T_{ON}$) including the first and second predetermined time periods ($T_{ON1}$, $T_{ON2}$) is expected. In this embodiment, the control module 49 obtains, based on the detected AC voltage, the operating frequency of the energy source 3 and the time points at which the first order derivative of the AC voltage is equal to zero. However, in other embodiments, the control module 49 may detect the vibration displacement of the energy source 3, and obtain, based on the detected vibration displacement, the operating frequency of the energy source 3 and the time points at which the first order derivative of the AC voltage is equal to zero.

It should be noted herein that while the second control switch 47 is shown to be switched to the ON state immediately after the first control switch 43 is switched to the OFF state in this embodiment, such "immediate" transition of the second control switch 47 into the ON state upon transition of the first control switch 43 into the OFF state is not a necessary limitation in other embodiments of the present invention.

The control module 49 further adjusts, for each cycle (T), the time difference between the transition time point ($t_1$) and the start time point ($t_0$) to change a phase difference ($\phi$) between a center time point of the total ON time period ($T_{ON}$) and a closest time point at which the first order derivative of the AC voltage is equal to zero, and also further adjusts the impedance of the impedance emulation module 48 to change a voltage ($V_{OUT}$) across the filtering capacitor 44 in such away that the output power of the energy source 3 is increased. Theoretically, when the time difference between the transition time point ($t_1$) and the start time point ($t_0$) is adjusted to equal a target time difference ($T_{TARGET}$) that makes the phase difference ($\phi$) equal a target phase difference ($\phi_{TARGET}$), and when the impedance of the impedance emulation module 48 is adjusted to equal a value that makes the voltage ($V_{OUT}$) equal a target voltage ($V_{TARGET}$), impedances at two sides of an interface (A-A') are complex conjugates of each other, and thus the output power of the energy source 3 reaches its maximum. The target phase difference ($\phi_{TARGET}$) the target time difference ($T_{TARGET}$) and the target voltage ($V_{TARGET}$) are expressed by the following equations, respectively:

$$\phi_{TARGET} = \arctan\frac{X_S(\omega) - 1/\omega C_P}{R_S}, \quad \text{equation 9}$$

$$T_{TARGET} = \frac{\phi_{TARGET}}{\omega} - 0.5T_{ON} + nT, \quad \text{equation 10}$$

and $$V_{TARGET} = \left[\frac{\pi}{8}\frac{1}{\cos\phi_{TARGET}} - \frac{\cos\phi_{TARGET}}{2\omega R_S C_P}\right]V_S, \quad \text{equation 11}$$

where $R_S$ and $X_S(\omega)$ respectively denote a resistance and a reactance of the impedance circuit 32 of the energy source 3, $-1/\omega C_P$ denotes a reactance of the clamp capacitor 33 of the energy source 3, $\omega=2\pi f$, n is an integer that is greater than or equal to zero and that makes $T_{TARGET} \geq 0$ and $V_S$ denotes an amplitude of the source voltage. In this embodiment, $R_S = R_{321}$, $X_S(\omega) = \omega L_{322} - 1/\omega C_{323}$, where $R_{321}$, $L_{322}$ and $C_{323}$ respectively denote a resistance of the source resistor 321, an inductance of the source inductor 322 and a capacitance of the source capacitor 323 of the impedance circuit 32 of the energy source 3. As shown in FIG. 10, when the operating frequency of the energy source 3 is smaller than an open circuit resonant frequency of the same (i.e., $1/\sqrt{L_{322}C_{323}C_P/(C_{323}+C_P)}$) the phase difference ($\phi$) is negative. As shown in FIG. 11, when the operating frequency is equal to the open circuit resonant frequency, the phase difference ($\phi$) is equal to zero. As shown in FIG. 12, when the operating frequency is greater than the open circuit resonant frequency, the phase difference ($\phi$) is positive.

It is noted that, in other embodiments, the following modifications may be made to the fourth preferred embodiment:

1. The diode 45 may be omitted.
2. The second inductor 46 and the second control switch 47 may be omitted. In this case, the total ON time period ($T_{ON}$) only includes the first predetermined time period ($T_{ON1}$) of the first control switch 43.

3. The impedance emulation module 48 may be omitted.

4. The start time point ($t_0$) for each cycle (T) may not be the respective time point at which the first order derivative of the AC voltage is equal to zero.

5. Each of the first to fourth converting diodes 415-418 of the AC-to-DC converting module 41 may be replaced by a switch. In this case, the control module 49 is further coupled to the AC-to-DC converting module 41, and controls, based on the detected AC voltage, operation of each of the switches between an ON state and an OFF state such that the AC voltage is converted into the DC voltage.

6. The control module 49 may obtain an output power of the energy harvesting device 4 based on, for example, the voltage ($V_{OUT}$) and the impedance of the impedance emulation module 48, and adjust the time difference between the transition time point ($t_1$) and the start time point ($t_0$) and the impedance of the impedance emulation module 48 such that the output power of the energy harvesting device 4 is increased.

7. The diode 45 may be replaced by a switch. In this case, the control module 49 is further coupled to the switch, and controls operation of the switch between an ON state and an OFF state such that the switch operates in the ON state for a predetermined time period immediately after each transition of the first control switch 43 from the ON state to the OFF state.

Figure 13:
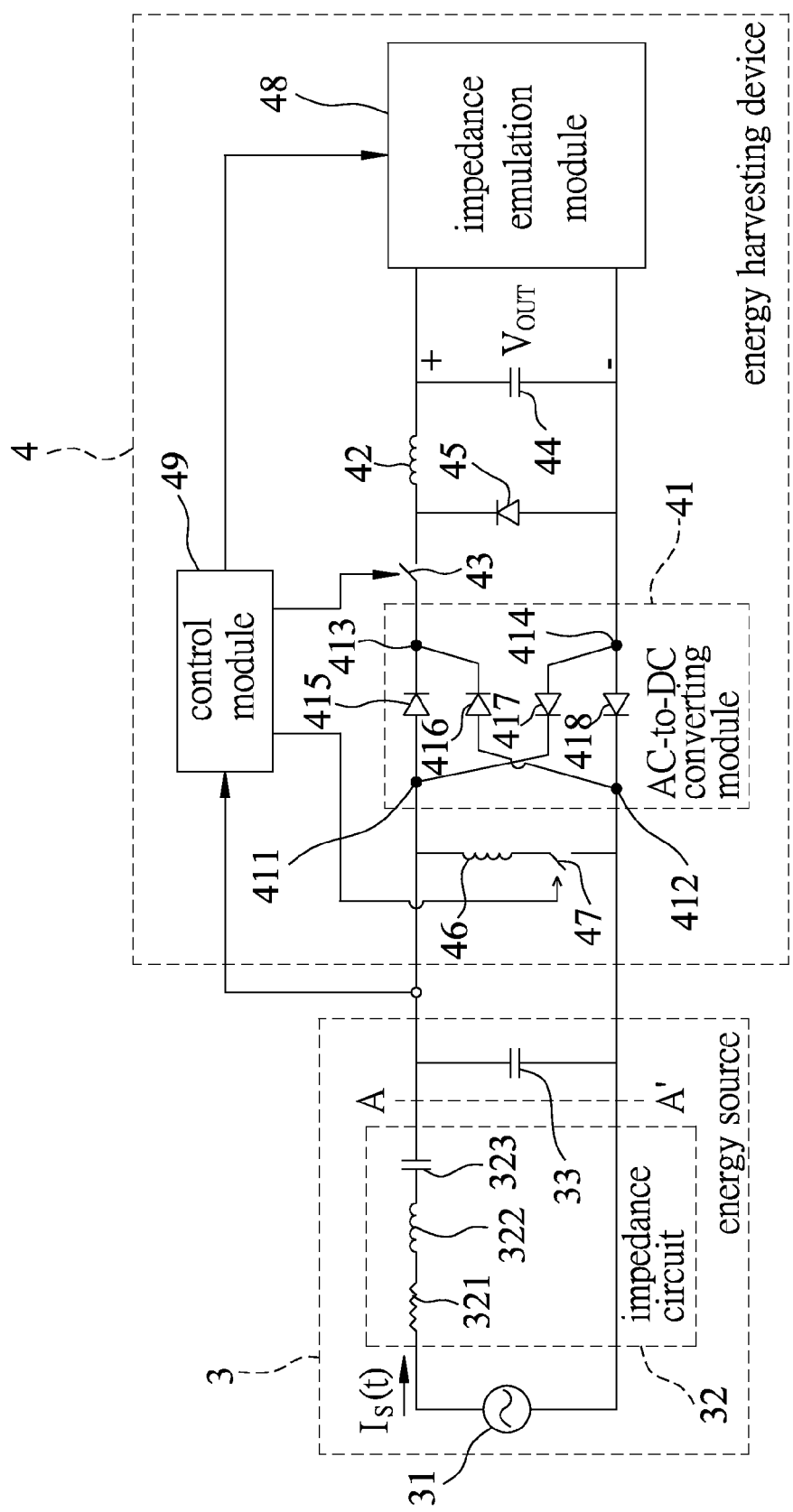
FIG. 13 is a schematic circuit diagram illustrating a first modification of the fourth preferred embodiment.

8. As shown in FIG. 13, when the first inductor 42 is coupled between the first control switch 43 and the filtering capacitor 44, the cathode of the diode 45 may be coupled to a common node between the first inductor 42 and the first control switch 43, instead of the first output terminal 413 of the AC-to-DC converting module 41.

Figure 14:
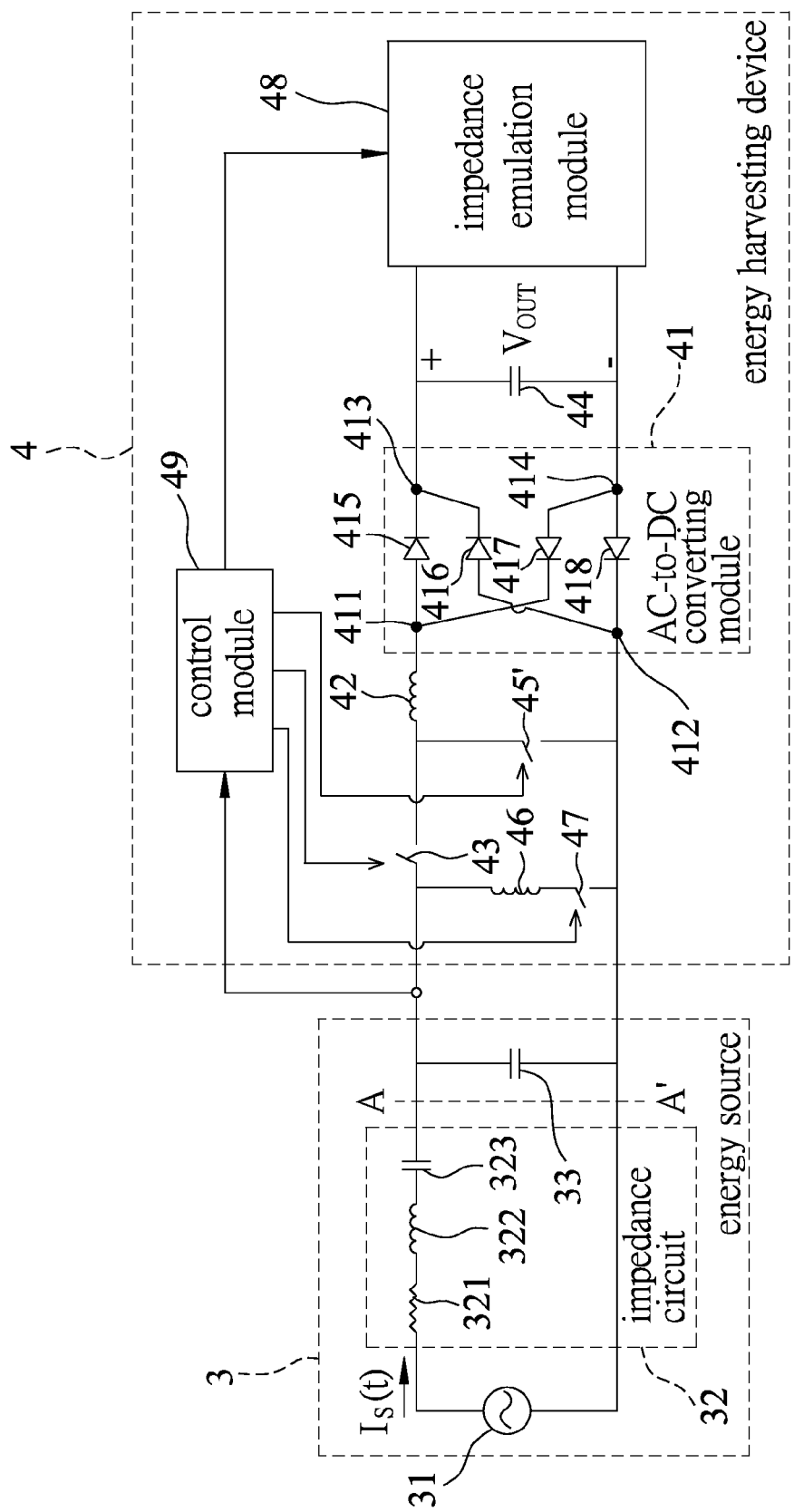
FIG. 14 is a schematic circuit diagram illustrating a second modification of the fourth preferred embodiment.

9. As shown in FIG. 14, the series connection of the first inductor 42 and the first control switch 43 may be coupled between the energy source 3 and the first input terminal 411 of the AC-to-DC converting module 41, with the first control switch 43 coupled to the energy source 3 and the first inductor 42 coupled to the first input terminal 411 of the AC-to-DC converting module 41. The series connection of the second inductor 46 and the second control switch 47 may be coupled to the series connection of the first inductor 42 and the first control switch 43 in series between the first and second input terminals 411, 412 of the AC-to-DC converting module 41 as shown; alternatively, the second inductor 46 and the second control switch 47 may be omitted. The diode 45 (see FIG. 9) may be replaced by a switch 45' that is coupled between a common node between the first inductor 42 and the first control switch 43 and the second input terminal 412 of the AC-to-DC converting module 41 and that is controlled by the control module 49 as shown; alternatively, the diode 45 (see FIG. 9) may be omitted. In this case, the filtering capacitor 44 is coupled between the first and second output terminals 413, 414 of the AC-to-DC converting module 41.

Figure 2:
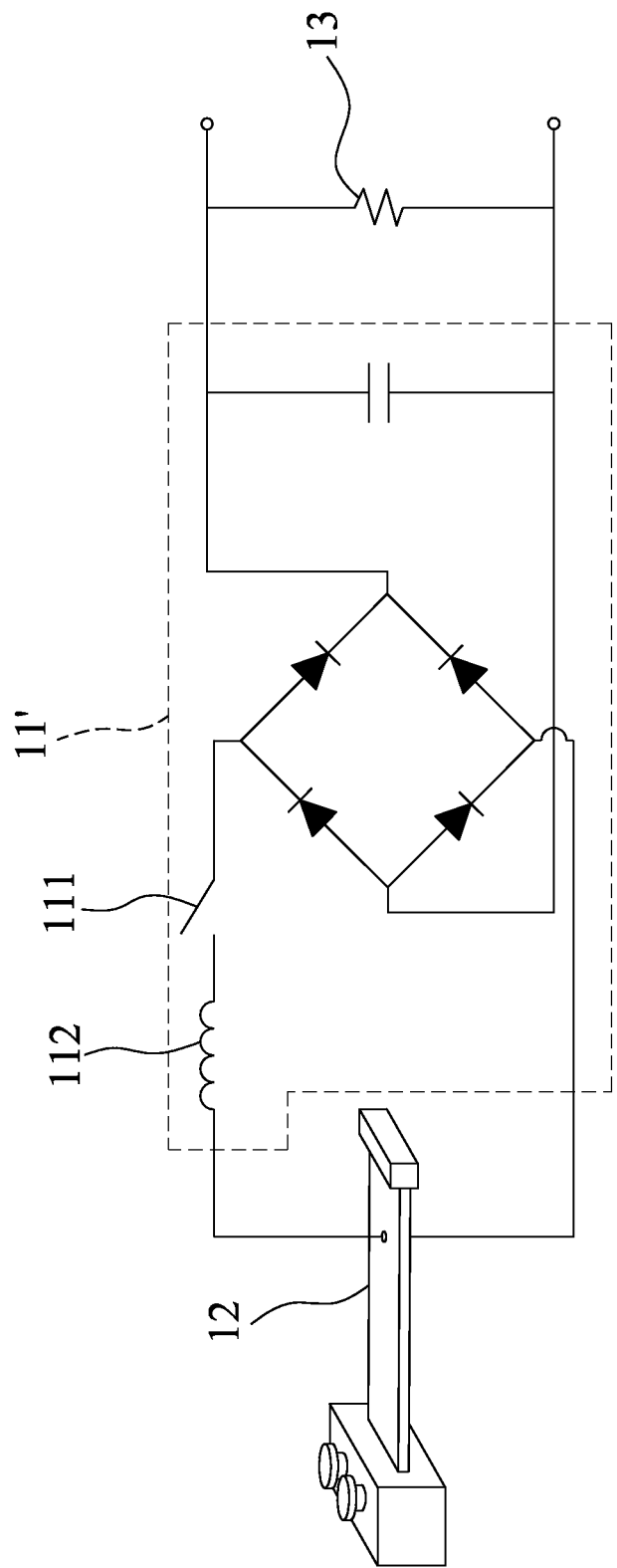
FIG. 2 is a schematic circuit diagram illustrating a second conventional energy harvesting device.

In view of the above, in this embodiment, since the control module 49 adjusts the time difference between the transition time point ($t_1$) and the start time point ($t_0$) to make the phase difference ($\phi$) equal the target phase difference ($\phi_{TARGET}$) and adjusts the impedance of the impedance emulation module 48 to make the voltage ($V_{OUT}$) equal the target voltage ($V_{TARGET}$), the output power of the energy source 3 and thus the energy harvested by the energy harvesting device 4 from the energy source 3 do not change with deviation of the operating frequency of the energy source 3 from the open circuit resonant frequency of the same. Moreover, even if the voltage ($V_{OUT}$) is not equal to the target voltage ($V_{TARGET}$) the energy harvested by the energy harvesting device 4 from the energy source 3 decreases less rapidly with the deviation of the operating frequency from the open circuit resonant frequency as compared to the second conventional energy harvesting device 11' (see FIG. 2).

Referring to FIGS. 9 to 12, the fifth preferred embodiment of an energy harvesting device 4 according to this invention is a modification of the fourth preferred embodiment. Unlike the fourth preferred embodiment, the control module 49 of the fifth preferred embodiment only detects the AC voltage, and does not detect the AC current nor does it obtain the output power of the energy source 3. Moreover, the control module 49 obtains the target time difference ($T_{TARGET}$) of Equation 10 based on the resistance and the reactance of the impedance circuit 32 of the energy source 3, on the reactance of the clamp capacitor 33 of the energy source 3, on the operating frequency of the energy source 3 and on the total ON time period ($T_{ON}$), and controls the time difference between the transition time point ($t_1$) and the start time point ($t_0$) to equal the target time difference ($T_{TARGET}$). The control module 27 further obtains the target voltage ($V_{TARGET}$) of Equation 11 based on the resistance and the reactance of the impedance circuit 323 of the energy source 3, on the reactance of the clamp capacitor 33 of the energy source 3 and on the amplitude of the source voltage, and controls the impedance of the impedance emulation module 48 based on the target voltage ($V_{TARGET}$) such that the voltage ($V_{OUT}$) is equal to the target voltage ($V_{TARGET}$).

It is noted that the fifth preferred embodiment is suitable under the circumstance where the resistance and the reactance of the impedance circuit 323 of the energy source 3, the reactance of the clamp capacitor 33 of the energy source 3 and the amplitude of the source voltage can be known precisely. On the contrary, the fourth preferred embodiment is suitable for various situations. Moreover, in a circumstance where the resistance and the reactance of the impedance circuit 323 of the energy source 3, the reactance of the clamp capacitor 33 of the energy source 3 and the amplitude of the source voltage can be known approximately, the fourth and fifth preferred embodiments can be combined. In such case, the approximate target time difference ($T_{TARGET}$) is obtained based on Equation 10 and serves as an initial value of the time difference between the transition time point ($t_1$) and the start time point ($t_0$), the approximate target voltage ($V_{TARGET}$) is obtained based on Equation 11, an initial value of the impedance of the impedance emulation module 48 is obtained based on the approximate target voltage ($V_{TARGET}$) and the time difference between the transition time point ($t_1$) and the start time point ($t_0$) and the impedance of the impedance emulation module 48 are then adjusted from these initial values, thereby reducing the overall adjustment time.

Figure 15:
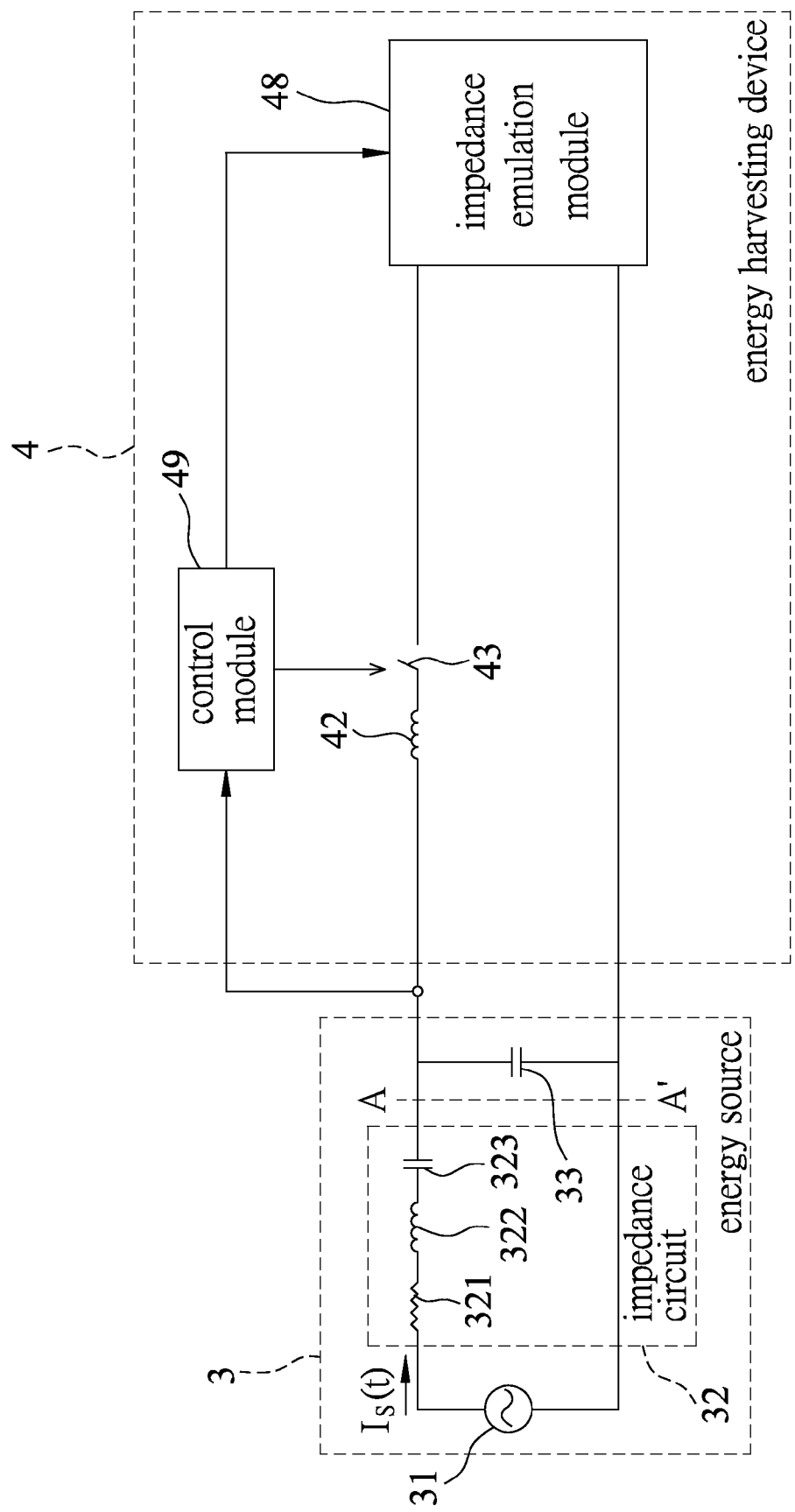
FIG. 15 is a schematic circuit diagram illustrating the sixth preferred embodiment of an energy harvesting device according to this invention.

Referring to FIG. 15, the sixth preferred embodiment of an energy harvesting device 4 according to this invention is a modification of the fourth preferred embodiment. Unlike the fourth preferred embodiment, the energy harvesting device 4 of the sixth preferred embodiment does not include the AC-to-DC converting module 41 (see FIG. 9), the filtering capacitor 44 (see FIG. 9), the diode 45 (see FIG. 9), the second inductor 46 (see FIG. 9) and the second control switch 47 (see FIG. 9). Therefore, the energy harvesting device 4 of the sixth preferred embodiment does not convert the AC voltage into a DC voltage. Moreover, the series connection of the first inductor 42 and the first control switch 43 is coupled between the energy source 3 and the impedance emulation module 48 (i.e., the impedance emulation module 48 is coupled in series to the series connection of the first inductor 42 and the first control switch 43).

While this invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. An energy harvesting device for harvesting energy from an energy source that outputs an alternating current (AC) voltage and an AC current, said energy harvesting device comprising:
    an AC-to-DC (direct current) converting module having two input terminals that are adapted to be coupled to the energy source for receiving the AC voltage therefrom, and two output terminals, said AC-to-DC converting module converting the AC voltage into a DC voltage, and outputting the DC voltage at said output terminals;
    an inductor and a control switch coupled in series between said input terminals of said AC-to-DC converting module;
    a filtering capacitor coupled between said output terminals of said AC-to-DC converting module; and
    a control module coupled to said control switch, and controlling operation of said control switch between an ON state and an OFF state such that said control switch starts to operate in the ON state for a predetermined time period from a transition time point during each predetermined cycle starting from a start time point, and such that a time difference between the transition time point and the start time point is variable;
    said control module being adapted to be coupled to the energy source for detecting the AC voltage and the AC current therefrom, said control module obtaining an output power of the energy source based on the detected AC voltage and the detected AC current, and adjusting the time difference between the transition time point and the start time point such that the output power of the energy source is increased.

2. The energy harvesting device of claim 1, wherein the start time point is a respective time point at which a first order derivative of the AC voltage is equal to zero.

3. The energy harvesting device of claim 1, further comprising an impedance emulation module that is coupled to said filtering capacitor in parallel, and that has a variable impedance;
    wherein said control module is further coupled to said impedance emulation module, and adjusts the impedance of said impedance emulation module to change a voltage across said filtering capacitor such that the output power of the energy source is increased.

4. The energy harvesting device of claim 1, the energy source operating at an operating frequency, and equivalently including an AC supply and an impedance circuit, the AC supply supplying a source voltage to the impedance circuit such that the impedance circuit outputs the AC voltage;
    wherein said control module further obtains a target time difference based on a resistance and a reactance of the impedance circuit of the energy source, on the operating frequency and on the predetermined time period, and controls the time difference between the transition time point and the start time point to be equal to the target time difference.

5. The energy harvesting device of claim 4, wherein the target time difference is obtained using the following equations:

$$T_{TARGET} = \frac{\phi_{TARGET}}{\omega} - 0.5T_{ON} + nT,$$

$$\phi_{TARGET} = \arctan\frac{X_S(\omega)}{R_S},$$

$$\omega = 2\pi f,$$

and $$T = 0.5f,$$

where $T_{TARGET}$ denotes the target time difference, $R_S$ and $X_S(\omega)$ respectively denote the resistance and the reactance of the impedance circuit of the energy source, f denotes the operating frequency, $T_{ON}$ denotes the predetermined time period, and n is an integer greater than or equal to zero.

6. The energy harvesting device of claim 1, the energy source operating at an operating frequency, and equivalently including an AC supply and an impedance circuit, the AC supply supplying a source voltage to the impedance circuit such that the impedance circuit outputs the AC voltage, said energy harvesting device further comprising an impedance emulation module that is coupled to said filtering capacitor in parallel, and that has a variable impedance;
    wherein said control module is further coupled to said impedance emulation module, obtains a target voltage based on a resistance and a reactance of the impedance circuit of the energy source and on an amplitude of the source voltage, and controls the impedance of said impedance emulation module based on the target voltage such that a voltage across said filtering capacitor is equal to the target voltage.

7. The energy harvesting device of claim 6, wherein the target voltage is obtained using the following equations:

$$V_{TARGET} = \frac{\pi}{8}\frac{1}{\cos\phi_{TARGET}}V_S,$$

and $$\phi_{TARGET} = \arctan\frac{X_S(\omega)}{R_S},$$

where $V_{TARGET}$ denotes the target voltage, $R_S$ and $X_S(\omega)$ respectively denote the resistance and the reactance of the impedance circuit of the energy source, and $V_S$ denotes the amplitude of the source voltage.

8. An energy harvesting device for harvesting energy from an energy source that outputs an alternating current (AC) voltage and an AC current, said energy harvesting device comprising:
    an AC-to-DC (direct current) converting module having two input terminals that are adapted to be coupled to the energy source for receiving the AC voltage therefrom, and two output terminals, said AC-to-DC converting module converting the AC voltage into a DC voltage, and outputting the DC voltage at said output terminals;
    a first inductor, a first control switch and a filtering capacitor coupled in series between said output terminals of said AC-to-DC converting module; and
    a control module coupled to said first control switch, and controlling operation of said first control switch between an ON state and an OFF state such that said first control switch starts to operate in the ON state for a first predetermined time period from a transition time point during each predetermined cycle starting from a start time point, and such that a time difference between the transition time point and the start time point is variable;

said control module being adapted to be coupled to the energy source for detecting the AC voltage and the AC current therefrom, said control module obtaining an output power of the energy source based on the detected AC voltage and the detected AC current, and adjusting the time difference between the transition time point and the start time point such that the output power of the energy source is increased.

9. The energy harvesting device of claim 8, wherein the start time point is a respective time point at which a first order derivative of the AC voltage is equal to zero.

10. The energy harvesting device of claim 8, further comprising an impedance emulation module that is coupled to said filtering capacitor in parallel, and that has a variable impedance;

wherein said control module is further coupled to said impedance emulation module, and adjusts the impedance of said impedance emulation module to change a voltage across said filtering capacitor such that the output power of the energy source is increased.

11. The energy harvesting device of claim 8, the energy source operating at an operating frequency, and equivalently including an AC supply, an impedance circuit and a clamp capacitor, the AC supply supplying a source voltage to the impedance circuit, the impedance circuit outputting the AC voltage across the clamp capacitor;

wherein said control module further obtains a target time difference based on a resistance and a reactance of the impedance circuit of the energy source, on a reactance of the clamp capacitor of the energy source, on the operating frequency and on a total ON time period that includes the first predetermined time period, and controls the time difference between the transition time point and the start time point to be equal to the target time difference.

12. The energy harvesting device of claim 11, wherein the target time difference is obtained using the following equations:

$$T_{TARGET} = \frac{\phi_{TARGET}}{\omega} - 0.5T_{ON} + nT,$$

$$\phi_{TARGET} = \arctan\frac{X_S(\omega) - 1/\omega C_P}{R_S},$$

$$\omega = 2\pi f,$$

and $$T = 0.5f,$$

where $T_{TARGET}$ denotes the target time difference, $R_S$ and $X_S(\omega)$ respectively denote the resistance and the reactance of the impedance circuit of the energy source, $-1/\omega C_P$ denotes the reactance of the clamp capacitor of the energy source, f denotes the operating frequency, $T_{ON}$ denotes the total ON time period, and n is an integer greater than or equal to zero.

13. The energy harvesting device of claim 8, the energy source operating at an operating frequency, and equivalently including an AC supply, an impedance circuit and a clamp capacitor, the AC supply supplying a source voltage to the impedance circuit such that the impedance circuit outputs the AC voltage across the clamp capacitor, said energy harvesting device further comprising an impedance emulation module that is coupled to said filtering capacitor in parallel, and that has a variable impedance;

wherein said control module is further coupled to said impedance emulation module, obtains a target voltage based on a resistance and a reactance of the impedance circuit of the energy source, on a reactance of the clamp capacitor of the energy source and on an amplitude of the source voltage, and controls the impedance of said impedance emulation module based on the target voltage such that a voltage across said filtering capacitor is equal to the target voltage.

14. The energy harvesting device of claim 13, wherein the target voltage is obtained using the following equations:

$$V_{TARGET} = \left[\frac{\pi}{8}\frac{1}{\cos\phi_{TARGET}} - \frac{\cos\phi_{TARGET}}{2\omega R_S C_P}\right]V_S,$$

and $$\phi_{TARGET} = \arctan\frac{X_S(\omega) - 1/\omega C_P}{R_S},$$

where $V_{TARGET}$ denotes the target voltage, $R_S$ and $X_S(\omega)$ respectively denote the resistance and the reactance of the impedance circuit of the energy source, $-1/\omega C_P$ denotes the reactance of the clamp capacitor of the energy source, and $V_S$ denotes the amplitude of the source voltage.

15. The energy harvesting device of claim 8, further comprising a second inductor and a second control switch coupled in series between said input terminals of said AC-to-DC converting module;

wherein said control module is further coupled to said second control switch, and controls operation of said second control switch between an ON state and an OFF state such that said second control switch operates in the ON state for a second predetermined time period after each transition of said first control switch from the ON state to the OFF state.

* * * * *